Patented Apr. 19, 1938

2,114,775

UNITED STATES PATENT OFFICE 2,114,775

RECOVERING ANTINEURITIC VITAMIN

Leopold R. Cerecedo, New York, N. Y.

No Drawing. Application March 7, 1936,
Serial No. 67,733

10 Claims. (Cl. 167—81)

This invention relates to recovering antineuritic vitamin; and it comprises a method of recovering the antineuritic vitamin, or vitamin B, as a series of preparations of increasing concentration and purity which are, however, severally useful wherein a raw material containing it, such as rice polishings, yeast, etc., is extracted with slightly acid aqueous liquid, which is neutralized, filtered, slightly acidified and the vitamin abstracted from the thus treated liquid by a base exchanging substance or zeolite, the vitamin being then recovered from the charged zeolite by treatment with a dissolved salt of a strong acid, thereby producing the corresponding salt of the vitamin in the form of a relatively pure, physiologically active solution; said solution, however, being ordinarily further treated by a series of operations, producing in each stage a therapeutically active purer preparation; all as more fully hereinafter set forth and as claimed.

The antineuritic vitamin, sometimes called vitamin B, or B1, has long been known and has been thereapeutically utilized in the form of more or less pure preparations. The exact chemical nature of vitamin B is not precisely known but it is apparently a definite chemical substance of basic nature and perhaps contains two heterocyclic rings, these rings respectively including sulfur and nitrogen. It forms salts which can be crystallized. The manufacture of these salts without great waste and consequent expense is an important technical problem. The antineuritic vitamin is contained in a great variety of natural materials, as in seeds, yeast, etc. In the seeds it is often concentrated in or near the hulls, and rice polishings are a favorite raw material. In all these materials, however, it is contained only in minimal amounts; large amounts of raw material must be treated to obtain appreciable amounts of the crystalline vitamin. The vitamin is not a particularly stable material and some decomposition of the vitamin occurs in and is inherent in most of the usual processes. This of course increases considerably the cost of manufacture.

In the present invention I provide a simplified method of recovery giving better yields, purer products and attended with less decomposition of vitamin founded on the fact that the vitamin is a basic substance forming salts amenable to "base exchange" methods using zeolites.

I have found that I can improve all the known processes of recovering vitamin B from these raw materials by intercalating in the procedure, as one stage, an operation wherein the vitamin is abstracted from an aqueous extract of a source material by a base exchanging material of the nature of a zeolite, the greater part of the other dissolved bodies present going forward.

Vitamin B is taken up by the zeolites and fixedly held and it can afterwards be recovered by a treatment of the charged zeolite with a solution of a neutral salt or in some cases a dilute acid. Any of the ordinary commercial base exchanging materials may be used, but I find it desirable to use high grade "wet process" zeolites. Glauconite can also be used. For the present purposes, all these materials may be called "zeolite".

While, as stated, zeolites may be used in their commercial form, in which they contain exchangeable soda, there is some advantage in acid extracting the zeolites to free them of base prior to use; the activity is somewhat greater. Commercial soda zeolites are somewhat alkaline and alkalinity is injurious to a vitamin solution. Commercial zeolites may, for instance, be extracted with weak acetic acid until the exchangeable base is wholly or in part removed; until the zeolite is converted into what is called an "H-ion zeolite". However, zeolites containing exchangeable sodium can be used. Whether the H-ion zeolite or soda zeolite be used, in the recovery stage the vitamin goes into solution as a salt.

The action of the zeolite on the aqueous solution is selective and a great proportion of the non-vitamin solids in the extracts passes on for discard. All extracts of vegetable matters are impure; they contain not only vitamin but non-vitaminic substances. The liquids recovered from the charged zeolites by base exchange, using the ordinary salts such as ammonium nitrate, sodium chloride, potassium chloride, etc., are relatively pure and are therapeutically useful in the form in which they are removed from the charged zeolite, with or without vacuum concentration. Barium nitrate is particularly efficient in regaining vitamin from the charged zeolite, but the effluent is not directly useful as a therapeutic agent since the barium must be removed. Calcium nitrate is also an efficient exchanging agent and the effluent contains no poisonous bodies.

Recapitulating, vitamin B is withdrawn from an extract containing many other substances by selective extraction with a zeolite and is then recovered from the zeolite as a much purer solution of one of its salts.

In recovering the vitamin from the zeolite, it is sometimes convenient to first treat with ammonium nitrate and follow this with barium nitrate solution. This procedure gives about 10 percent better yield than use of ammonium nitrate alone.

If a zeolite be used which is of such character as to withstand acid regeneration it is sometimes convenient to recover the vitamin from the zeolite with the aid of a weak acid, e. g. weak nitric acid; the vitamin going into solution as a nitrate.

A good useful commercial preparation directly available for therapeutic purposes is obtained by extracting rice polishings, etc. with a slightly acidified weak alcohol, neutralizing, filtering, passing through a bed of zeolite, washing the zeolites somewhat and base exchanging with a solution of ammonium nitrate, sodium chloride, etc. The effluent from the bed carrying a vitamin salt is quite pure. It may be concentrated by evaporation if desired.

While the effluent solution from the zeolite is of pure character and may be, as stated, used as it is, I commonly treat it further, making more concentrated and still purer preparations. As one step in the treatment I find it is advantageous to throw down the vitamin as a silver compound thereby isolating it from companion non-vitaminic substances. The precipitate is of pure character and can be used, after removal of the silver, in making preparations of high purity and great potency. The whole process may stop at this point.

Commonly, however, I go still further and purify to a still greater degree. One advantageous step is fractionation of the vitamin solution with silicotungstic acid. Phosphotungstic acid can be used, but I do not regard it as quite as desirable. It is important that with reagent, it be as pure as possible. A precipitate is formed which is separated, washed and broken up with baryta; the excess of baryta being afterwards removed with sulfuric acid. On acidifying with HCl, solutions of vitamin chlorides are formed which can be readily recovered in crystalline form by evaporation.

With particularly impure extracts, such as those obtained from yeast, it is sometimes advantageous to use various pre-purifications before the base exchange step, such as a treatment with lead acetate. Lead acetate removes much of the non-vitaminic extractive substances.

In a specific embodiment of this invention making a particularly pure, highly potent vitamin free of decomposition by-products and injurious constituents and readily obtained in crystalline form, I extract commercial "rice polish" with weak alcohol, say a liquid of about 15 per cent strength. It should be faintly acid with sulfuric acid, say a pH of 4.5. After removal of the extract from the rice hulls it is brought to neutrality, pH 7, by stirring in solid commercial crystallized barium hydroxide in the necessary amount. The precipitate of barium sulfate is removed. The liquid at this time is neutral but the vitamin being somewhat more stable in an acid solution, I therefore acidify somewhat, say to pH 4.5. The liquid is heated to 75 to 80° C. and allowed to percolate slowly through a granular bed of an acid washed commercial zeolite. As stated, commercial zeolites are somewhat alkaline and an acid wash of the granules prevents creation of local alkalinity in a slowly percolating column of vitamin solution. The acid wash preliminarily given the zeolite may be with highly dilute sulfuric acid, pH 4.5, weak acetic acid, or any other convenient acid. The amount of zeolite required for complete extraction of the vitamin depends somewhat on the activity of the zeolite and on the amount of vitamin in the raw material. With rice polish it is ordinarily desirable to use a rather large amount of zeolite.

The extract in percolating through the zeolite is freed of its vitamin content while other extractive matters pass forward. The zeolite is next washed somewhat with water and the vitamin removed by slowly percolating an ammonium nitrate solution through the pervious mass. The reverse exchange occurs, ammonia going into the zeolite and vitamin being withdrawn as nitrate. A normal ammonium nitrate solution is of convenient strength. With rice polish it commonly requires about 5 liters of this solution per kilo of zeolite. Extraction is best done at a temperature between 75 and 80° C. One advantage of using the acid extracted zeolite is that the effluent solution is still acid. As noted, vitamin B is more stable in acid solutions.

The acid effluent on neutralization with caustic soda solution to pH 7.5 usually gives some precipitate of inert material which is sent out of the system.

In some cases the slightly acid effluent obtained as just described is simply concentrated and used as a therapeutic agent. It represents a solution of a vitamin salt free of most of the accompanying impurities in the original extract. Non-basic impurities do not exchange and enter the zeolite. It may, however, still contain some foreign substances which do enter the zeolite.

Commonly, the liquid is fractionated with silver which takes down the vitamin leaving other substances remaining in solution. To the filtrate is added an aqueous 10 per cent silver nitrate solution and the mixture allowed to stand and precipitate. The precipitate is filtered off and washed, the filtrate and washings going out of the system. The washed precipitate is stirred with weak nitric acid of say pH 3 at about 50° C., to bring the vitamin into solution, the mixture cooled, partially neutralized, pH 4.5, with ammonia and allowed to stand for a time; say 24 hours. The liquid mixture is filtered to get rid of a precipitate which usually forms. The filtrate is fortified by the addition of a little silver nitrate solution and brought to neutrality, pH 7, with ammonia. The vitamin again precipitates as a silver compound which is filtered off, washed and broken up with hydrochloric acid in the presence of a little water. After removal of the silver chloride, a liquid containing the vitamin hydrochloride and of pure character and high potency is obtained. The process may stop at this point.

To effect a further purification and make preparations still more concentrated and potent, however, the liquid containing vitamin hydrochloride is neutralized with caustic soda, filtered and the filtrate precipitated with a solution of silicotungstic acid, the liquid being first made rather acid with sulfuric acid. The acidity may go as high as 0.6 normal. To secure complete precipitation it is in general desirable to allow the liquid to stand for 24 hours. The precipitated vitamin silicotungstate is collected, washed, suspended in water, the mixture neutralized with soda and sulfuric acid added until the pH is about 5.6. A new precipitate of silicotungstate forms. This is filtered off. A further crop of silicotungstate may be formed by cautious addition of acid to the filtrate, say to pH 4.5. This is collected. Each of the precipitates is washed and the washed wet solids decomposed with saturated baryta water in the cold. Insoluble barium silicotungstate is formed and the vitamin remains in solution. The liquid filtered from the precipitate contains excess barium and this is precipitated by a cautious addition of sulfuric acid. It may be added to give a pH of 7. At this time the vitamin exists in solution in the free state and the filtered liquid is therefore acidified with hydrochloric acid to form the hydrochloride. This addition of hydrochloric acid may be made prior to filtration. In this case the liquid after addition of hydrochloric acid is centrifuged and the barium salts removed.

The liquid obtained at this point is a somewhat acid solution of vitamin hydrochloride in a fairly pure state. It may still however contain a little inert non-vitamin matter. In the best method of operating I now know, the liquid is evaporated to dryness under vacuum at the ordinary temperature. The dry residue is taken up with a little water and precipitated by an addition of absolute alcohol, the vitamin hydrochloride not being soluble in alcohol. It is sometimes advantageous to add a little petroleum ether to the alcohol. The precipitate formed is often pure crystalline vitamin hydrochloride. Sometimes, however, it is advisable to repeat the purification with alcohol one or more times.

So far as is known, the vitamin hydrochloride formed in the described manner is wholly pure. It has a corresponding high potency, as evinced by physiological tests. It melts at 248—249° C.

In another specific embodiment of the present invention, brewers yeast is used as a source material, the yeast being extracted with weak alcohol slightly acidified with sulfuric acid (pH 4). Mostly, good extraction requires about one-half hour's heating at 80° C. The filtered extract is more impure than that obtained from the rice polish and I ordinarily purify it somewhat prior to employing zeolite to recover the vitamin. In one purification method used, the liquid is treated with solid barium hydroxide to approximate neutrality, say to pH 6.8, the precipitate removed and the filtrate again precipitated with neutral lead acetate solution, say of 25 per cent tenor, the acetate solution being added until precipitation no longer occurs. Both precipitates remove foreign matter. The liquid is filtered and excess of lead removed with sulfuric acid. It is found that these pre-purification steps do not result in a noticeable loss of activity.

The clear liquid obtained as just described is treated in the same manner as described in the preceding example, dealing with an extract of rice polish, being sent through a zeolite bed to abstract vitamin, and the vitamin afterwards extracted from the zeolite with a solution of a salt. In recovery, successive treatments with ammonium nitrate solution and barium nitrate solution give a somewhat better yield than the use of the equivalent amount of ammonium nitrate alone.

The described process in either embodiment may be employed in treating a variety of source materials, wheat germs, oat hulls, malt coombs, etc. Nearly all seeds and seed integuments contain the antineuritic vitamin in greater or less amount.

What I claim is:

1. In the recovery of the antineuritic vitamin from raw materials containing the same, the process which comprises producing a slightly acid aqueous extract, neutralizing the extract and filtering, making the liquid slightly acid, passing the liquid into contact with a solid base exchanging body, washing the base exchanger and recovering the vitamin in aqueous solution by base exchange the charged base exchanging body being treated with a solution of a neutral salt of a strong acid.

2. The process of claim 1 wherein the salt is ammonium nitrate.

3. The process of claim 1 wherein the salt is barium nitrate.

4. The process of claim 1 wherein the salt is sodium chloride.

5. The process of claim 1 wherein the base exchanging body is a commercial zeolite.

6. The process of claim 1 wherein the base exchanging body is an acid-washed commercial zeolite.

7. In the manufacture of extremely pure, highly potent vitamin B preparations from rice polish, yeast, oat hulls and other materials containing it, the process which comprises extracting the material with slightly acidified weak alcohol, filtering, passing the filtrate into contact with a zeolite, washing the zeolite, removing the vitamin by treatment of the zeolite with a saline solution, and purifying the solution by further treatments until a sufficiently pure vitamin preparation is obtained.

8. The process of claim 7 wherein the further purification includes a step of precipitating the vitamin as a silver compound.

9. The process of claim 7 wherein the further purification includes a step of precipitating the vitamin as a silicotungstate.

10. The process of claim 7 wherein the purification includes a step of precipitating the vitamin hydrochloride by alcohol.

LEOPOLD R. CERECEDO.

CERTIFICATE OF CORRECTION.

Patent No. 2,114,775.    April 19, 1938.

LEOPOLD R. CERECEDO.

It is hereby certified that error appears in the printed specification of the above numbered patent requiring correction as follows: Page 2, first column, line 36, before the word "reagent" insert either; and that the said Letters Patent should be read with this correction therein that the same may conform to the record of the case in the Patent Office.

Signed and sealed this 31st day of May, A. D. 1938.

(Seal)

Henry Van Arsdale,
Acting Commissioner of Patents.

is formed and the vitamin remains in solution. The liquid filtered from the precipitate contains excess barium and this is precipitated by a cautious addition of sulfuric acid. It may be added to give a pH of 7. At this time the vitamin exists in solution in the free state and the filtered liquid is therefore acidified with hydrochloric acid to form the hydrochloride. This addition of hydrochloric acid may be made prior to filtration. In this case the liquid after addition of hydrochloric acid is centrifuged and the barium salts removed.

The liquid obtained at this point is a somewhat acid solution of vitamin hydrochloride in a fairly pure state. It may still however contain a little inert non-vitamin matter. In the best method of operating I now know, the liquid is evaporated to dryness under vacuum at the ordinary temperature. The dry residue is taken up with a little water and precipitated by an addition of absolute alcohol, the vitamin hydrochloride not being soluble in alcohol. It is sometimes advantageous to add a little petroleum ether to the alcohol. The precipitate formed is often pure crystalline vitamin hydrochloride. Sometimes, however, it is advisable to repeat the purification with alcohol one or more times.

So far as is known, the vitamin hydrochloride formed in the described manner is wholly pure. It has a corresponding high potency, as evinced by physiological tests. It melts at 248—249° C.

In another specific embodiment of the present invention, brewers yeast is used as a source material, the yeast being extracted with weak alcohol slightly acidified with sulfuric acid (pH 4). Mostly, good extraction requires about one-half hour's heating at 80° C. The filtered extract is more impure than that obtained from the rice polish and I ordinarily purify it somewhat prior to employing zeolite to recover the vitamin. In one purification method used, the liquid is treated with solid barium hydroxide to approximate neutrality, say to pH 6.8, the precipitate removed and the filtrate again precipitated with neutral lead acetate solution, say of 25 per cent tenor, the acetate solution being added until precipitation no longer occurs. Both precipitates remove foreign matter. The liquid is filtered and excess of lead removed with sulfuric acid. It is found that these pre-purification steps do not result in a noticeable loss of activity.

The clear liquid obtained as just described is treated in the same manner as described in the preceding example, dealing with an extract of rice polish, being sent through a zeolite bed to abstract vitamin, and the vitamin afterwards extracted from the zeolite with a solution of a salt. In recovery, successive treatments with ammonium nitrate solution and barium nitrate solution give a somewhat better yield than the use of the equivalent amount of ammonium nitrate alone.

The described process in either embodiment may be employed in treating a variety of source materials, wheat germs, oat hulls, malt coombs, etc. Nearly all seeds and seed integuments contain the antineuritic vitamin in greater or less amount.

What I claim is:

1. In the recovery of the antineuritic vitamin from raw materials containing the same, the process which comprises producing a slightly acid aqueous extract, neutralizing the extract and filtering, making the liquid slightly acid, passing the liquid into contact with a solid base exchanging body, washing the base exchanger and recovering the vitamin in aqueous solution by base exchange the charged base exchanging body being treated with a solution of a neutral salt of a strong acid.

2. The process of claim 1 wherein the salt is ammonium nitrate.

3. The process of claim 1 wherein the salt is barium nitrate.

4. The process of claim 1 wherein the salt is sodium chloride.

5. The process of claim 1 wherein the base exchanging body is a commercial zeolite.

6. The process of claim 1 wherein the base exchanging body is an acid-washed commercial zeolite.

7. In the manufacture of extremely pure, highly potent vitamin B preparations from rice polish, yeast, oat hulls and other materials containing it, the process which comprises extracting the material with slightly acidified weak alcohol, filtering, passing the filtrate into contact with a zeolite, washing the zeolite, removing the vitamin by treatment of the zeolite with a saline solution, and purifying the solution by further treatments until a sufficiently pure vitamin preparation is obtained.

8. The process of claim 7 wherein the further purification includes a step of precipitating the vitamin as a silver compound.

9. The process of claim 7 wherein the further purification includes a step of precipitating the vitamin as a silicotungstate.

10. The process of claim 7 wherein the purification includes a step of precipitating the vitamin hydrochloride by alcohol.

LEOPOLD R. CERECEDO.

CERTIFICATE OF CORRECTION.

Patent No. 2,114,775. April 19, 1938.

LEOPOLD R. CERECEDO.

It is hereby certified that error appears in the printed specification of the above numbered patent requiring correction as follows: Page 2, first column, line 36, before the word "reagent" insert either; and that the said Letters Patent should be read with this correction therein that the same may conform to the record of the case in the Patent Office.

Signed and sealed this 31st day of May, A. D. 1938.

(Seal)

Henry Van Arsdale,
Acting Commissioner of Patents.

CERTIFICATE OF CORRECTION.

Patent No. 2,114,775. April 19, 1938.

LEOPOLD R. CERECEDO.

It is hereby certified that error appears in the printed specification of the above numbered patent requiring correction as follows: Page 2, first column, line 36, before the word "reagent" insert either; and that the said Letters Patent should be read with this correction therein that the same may conform to the record of the case in the Patent Office.

Signed and sealed this 31st day of May, A. D. 1938.

(Seal)

Henry Van Arsdale,
Acting Commissioner of Patents.